United States Patent [19]

Kruder

[11] 4,015,832

[45] Apr. 5, 1977

[54] EXTRUDER SCREWS

[75] Inventor: George A. Kruder, Marion, Ohio

[73] Assignee: Koehring Company, Milwaukee, Wis.

[22] Filed: Jan. 31, 1975

[21] Appl. No.: 545,863

Related U.S. Application Data

[62] Division of Ser. No. 282,905, Aug. 23, 1972, Pat. No. 3,870,284.

[52] U.S. Cl. .................. 259/191; 425/208
[51] Int. Cl.[2] .............. B29B 1/10; B29B 1/04; B29F 3/02; B29H 1/10
[58] Field of Search .......... 259/191, 192, 193, 9, 259/10, 25, 26, 45, 46, 97; 425/206, 207, 208, 209; 100/145

[56] References Cited

UNITED STATES PATENTS

| | | | |
|---|---|---|---|
| 2,765,490 | 10/1956 | Zona | 259/191 |
| 3,287,477 | 11/1966 | Vesilind | 425/208 X |
| 3,300,810 | 1/1967 | Gregory et al. | 259/191 |
| 3,431,599 | 3/1969 | Fogelberg | 259/191 |
| 3,633,880 | 1/1972 | Newmark | 425/208 X |
| 3,698,541 | 10/1972 | Barr | 259/191 X |
| 3,701,512 | 10/1972 | Schippers et al. | 259/191 |
| 3,764,114 | 10/1973 | Ocker | 259/192 X |

Primary Examiner—Harvey C. Hornsby
Assistant Examiner—Robert Pous
Attorney, Agent, or Firm—Burns, Doane, Swecker & Mathis

[57] ABSTRACT

A plasticating extruder screw is provided with a wave section in which the depth of the material conveying channel varies cyclically over a plurality of cycles. The wave section as a whole provides good pumping performance for metering the extrudate at a uniform rate. The deep valley portions of the wave section minimize heat inputs to the material being fed, and the shallow ridge portions of the wave section assure repeated intensive mixing of the material for providing high quality polymer melts. The minimum channel depth portions are in a balanced relationship about the axis of the screw to avoid lateral thrust problems. Such balance may be achieved in successive cycles of a single channel or as between adjacent channels of a multiple channel screw. The wave may be in the metering section of a single stage screw or in any of the pumping sections of a multiple stage screw.

3 Claims, 9 Drawing Figures

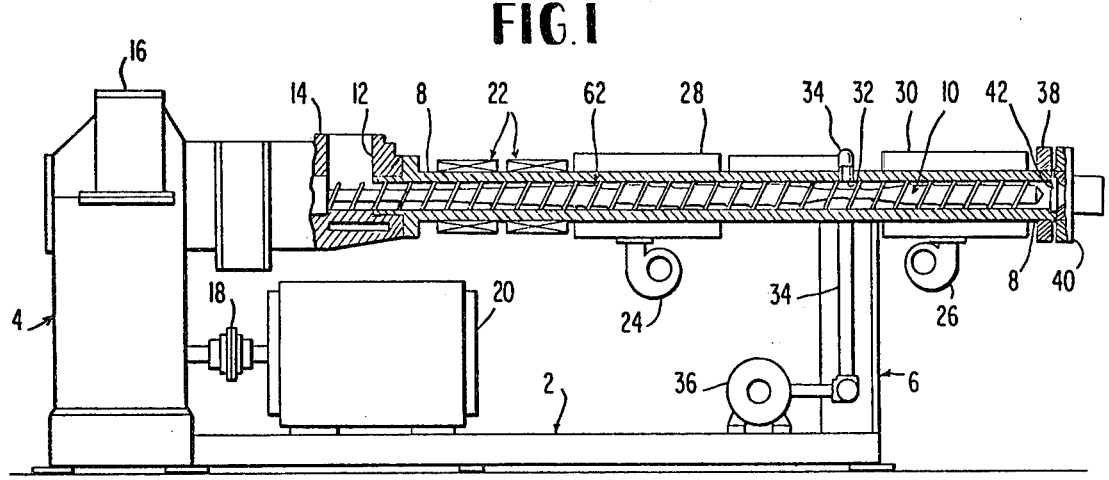
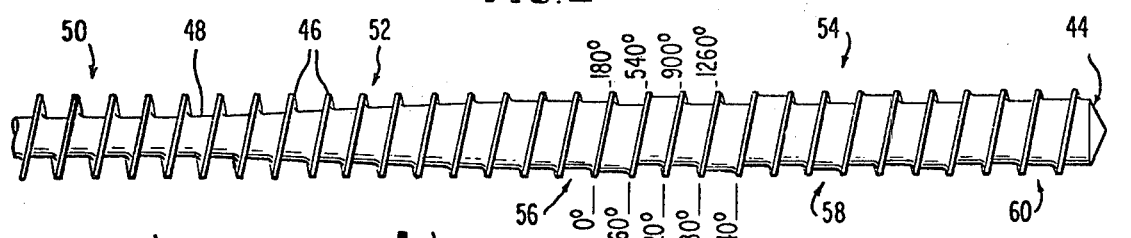
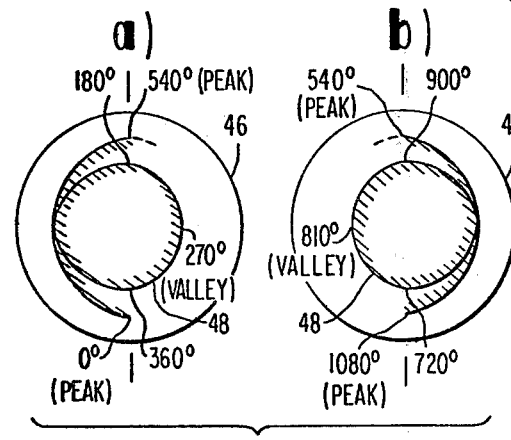
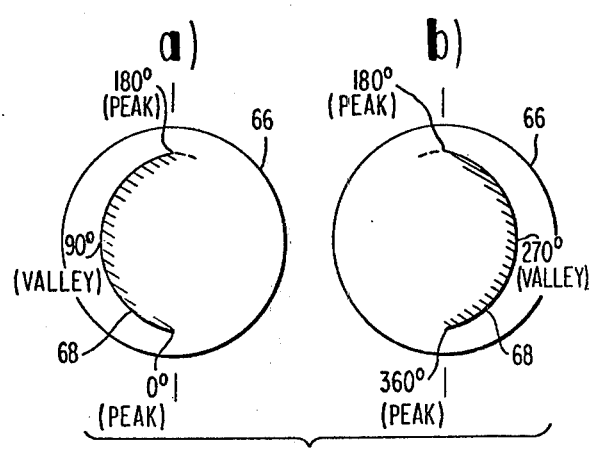
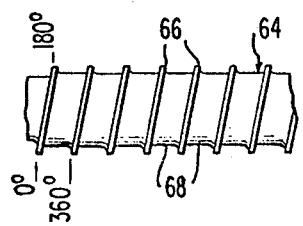

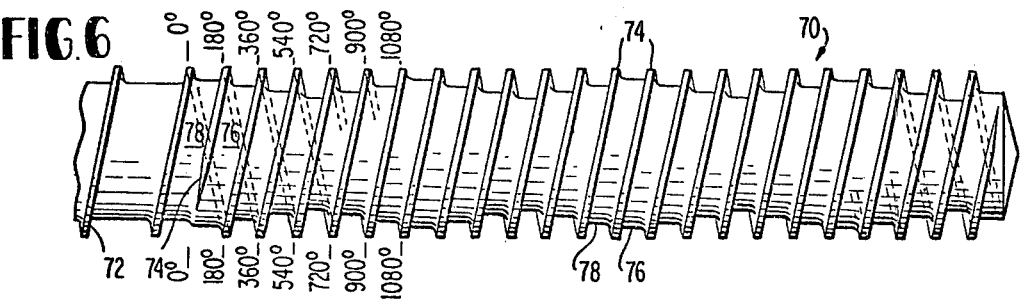
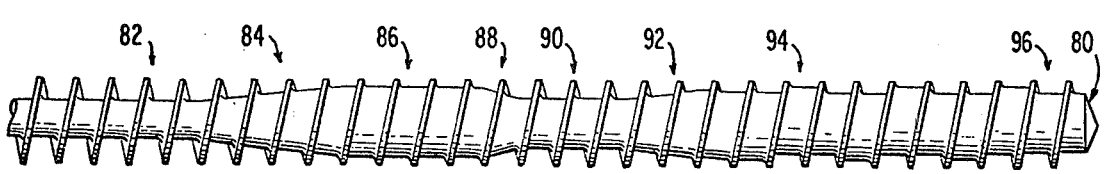
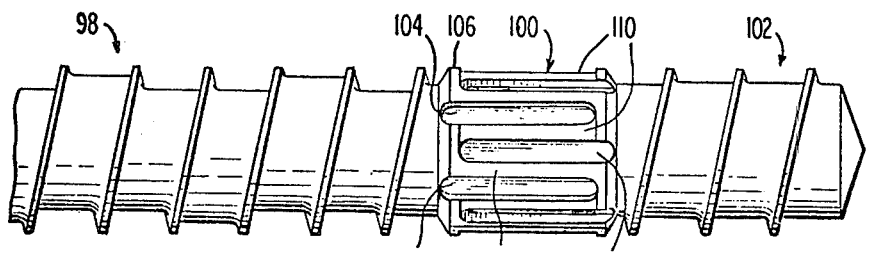

EXTRUDER SCREWS

This is a division of application Ser. No. 282,905, filed Aug. 23, 1972, and issued as U.S. Pat. No. 3,870,284 on Mar. 11, 1975.

BACKGROUND OF THE INVENTION

This invention relates to extruders of the type in which a screw rotatable within a barrel is employed to extrude material from a die connected to the outlet end of the barrel. The invention is concerned particularly with improvements in high output plasticating extruders.

A plasticating extruder receives polymer pellets or powder, works and raises the temperature of the polymer sufficiently to dispose it in a melted or plastic state, and delivers the melted polymer under pressure through a restricted outlet or die. Ordinarily it is desirable that the extrudate be fully melted, uniform in temperature, and substantially free of small gels and other fine structure agglomerations. It also is desirable that the rate of delivery of the molten polymer through the die be regulatable simply by changing the rate of extruder screw rotation and that the rate of delivery at the selected screw speed be substantially uniform.

The basic extruder apparatus includes an elongated barrel which may be heated or cooled at various locations along its length and a screw which extends longitudinally through the barrel. The screw has a helical land on its surface which cooperates with the cylindrical internal surface of the barrel to define an elongaged helical channel. Although the pitch of the screw may vary along the length thereof, it is common at the present time to utilize screws of constant pitch where the pitch is "square", that is, where the distance between adjacent flights is equal to the diameter. The screw is rotated about its own axis to work the plastic material and feed it toward the outlet end of the barrel.

An extruder screw ordinarily has a plurality of sections which are of configurations specially suited to the attainment of particular functions. Examples are "feed" sections amd "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. In this section the channel depth of the screw is usually large enough to over-feed the solid polymer. This is a desirable effect because the over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

An extruder screw "metering" section has as its special function the exertion of a pumping action on the molten polymer. Ordinarily the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but of course it may affect such factors as back pressure and material viscosity, which factors, in turn, affect significantly the pressure flow component. On the other hand pressure flow is directly affected by both the depth and length of the screw channel; an increase in channel depth has a tendency to increase greatly the pressure flow component and an increase in channel has a tendency to reduce this back flow component.

In addition to the basic feed and metering sections an extruder screw also may include a number of other distinct sections. Nearly all screws include so-called "transition" sections and some include "vent" sections. Many modern screws also include or have attached thereto special "mixer" sections or devices which provide intensive mixing actions within the at least partially molten polymer. In a typical mixer section, the material is required to move past a barrier of some sort in order to proceed downstream to the extruder outlet. The barrier may, for example, be in the form of one or more lands each having a greater clearance than normal with respect to the extruder barrel surface, and the screw may be so configured that all of the plastic material must pass over the barrier lands. Such barrier lands may be helical or they may extend axially of the screw. Various arrangements of pins and holes also have been employed with some success to achieve intensive mixing.

Over the years there has been a trend toward the use of extruders capable of high outputs. In many applications, various economies in production are possible where high extruder outputs can be obtained on a reliable basis.

However, difficulties have been experienced in increasing extruder outputs. In order to increase the output of an extruder, it is necessary to increase the speed of the screw and/or to increase its channel depth, but both of these approaches may have adverse effects.

An increase in the relative speed between the periphery of the screw and the extruder barrel increases shear rate and consequently has a tendency to raise the temperature of the polymer. The temperature rise may reach runaway proportions, contributing to thermal degradation of the polymer. Further, increases in shear rate and temperature usually have marked effects upon viscosity. A change in viscosity of the material being extruded in turn affects the flow rate of the material through the restricted outlet of the extruder, so that there is a failure to achieve the desired uniformity in output rate.

An increase in channel depth has an opposite effect upon temperature. This is so because the material near the root of a deep channel is not subjected to the same high shear forces as are exerted upon the material adjacent the barrel of the extruder. This low shear level near the bottom of a deep channel is desirable from the standpoint of minimizing the likelihood of runaway temperature increases but it is undesirable from the standpoint of achieving high quality extrudate. After solid bed breakup, some polymer particles remain in solid form for a substantial length of time. The melting of these isolated particles is facilitated by localized mixing actions within the material being fed along the extruder. Such localized mixing depends upon the development of substantial shear forces and these are difficult to develop in the lower regions of deep channels.

Such difficulties are particularly pronounced at high output rates because, in an extruder of a given length, an increase in output rate will be accompanied by a shift toward the outlet of the zone in which the polymer normally exists in solid form. As a result, it is not unreasonable to expect solid particles to find their way along the entire length of a high output, deep channel extruder screw on occasions. The presence of even a small quantity of polymer at the breaker plate or other restricted output zone in an extruder can have important adverse effects upon output uniformity.

SUMMARY OF THE INVENTION

It is the general object of this invention to provide improved methods and apparatus for dealing with problems of the types mentioned above.

A more particular object of this invention is to provide an extruder screw of a novel configuration that contributes to the attainment of high quality polymer melts and high output rates.

Another object of this invention is to provide methods and apparatus for achieving good extrudate metering performance at high rates but without developing excessive temperatures and irregularities in the consistency of the material being extruded.

A more specific object of this invention is to provide a screw extruder with a capability for cyclically varying the shearing force patterns asserted upon the material being fed by the screw as that material is advanced along the length of the extruder. Such cyclical variations result in intensive mixing effects and also in temperature rise controlling effects, so that it becomes possible to obtain higher output rates without undesirable side effects.

These and other objects are achieved by the provision of an extruder screw having a channel portion of undulating depth. In a preferred form, a metering section of an extruder screw is configured so that the depth of the generally helical channel between adjacent flights of the screw land varies cyclically. The channel depth varies smoothly as a "wave", with the floor or bottom of the polymer channel repetitively rising toward and then falling away from the cylindrical inner surface of the extruder barrel.

In a wave screw section according to the invention, a single cycle of the wave should have an angular extent about the axis of the screw of from about 180° to about 1,000°. That is to say, in moving along a channel from one zone of minimum channel depth to the next zone of minimum depth, one would move around the axis of the screw about one-half turn to about three turns.

For most applications, wave screw sections in accordance with the invention should be rather long. It is anticipated that at least three wave cycles would be employed, and in most instances larger numbers of cycles will be found more appropriate. The pumping or metering qualities of the wave screw section are stabilized by the presence of a number of cycles because each cycle tends to reinforce the pumping action of its predecessor. In this sense, a long wave screw section is comparable to a long metering screw section of conventional configuration, and it is possible to obtain with a long wave screw section a highly uniform screw output rate which is relatively independent of back pressure fluctuations.

The minimum channel depth portions provide narrowed passages through which the advancing material must be squeezed with the accompanying development of high shear forces and good mixing. The maximum channel depth portions have an opposite effect; these provide zones where the shear is relatively low and where there is a reduced tendency to heat the polymer. Hence, the concept of the cyclically varying channel portions provides for both good temperature control and good mixing. In addition, the wave section provides highly satisfactory pumping or metering characteristics.

A wave screw section according to the invention may have a single helical channel or multiple helical channels running side by side. In any event, it is preferred that the waves be balanced with respect to side thrusts. For example, if a minimum depth channel section of one cycle is located at the top of the screw, there should be a minimum channel depth section of another nearby cycle located at the bottom of the screw so that the screw will not be subjected to severe bending forces as it rotates within a barrel filled with polymer. The desired balance may be accomplished in a single channel screw by using cycles having lengths which extend about the screw axis 180°, 540°, etc. In double channel screws, the waves in adjacent channels may be out of phase with each other to achieve the desired balance at each lengthwise portion of the screw.

The wave section may be incorporated in single or multiple stage screws if desired. Also, it may be used in combination with constant channel depth sections and with barrier type mixing sections where desired.

A more complete understanding of these and other features and advantages of the invention will be gained from a consideration of the following description of certain embodiments illustrated in the accompanying drawings.

BRIEF DESCRIPTION OF THE DRAWINGS

FIG. 1 is an elevational view, partially in cross-section, of a plasticating extruder embodying the present invention.

FIG. 2 is an elevational view of showing another extruder screw embodying a wave section in accordance with the invention.

FIG. 3 is a pair of diagrams $a$ and $b$ illustrating the changes in channel depth as one proceeds along two successive cycles of the wave section illustrated in FIG. 2.

FIG. 4 is a partial elevational view of a portion of still another form of extruder screw in accordance with the invention.

FIG. 5 is a pair of diagrams a and b illustrating the channel depth variations in two successive cycles of the wave section of the screw shown in FIG. 4.

FIG. 6 is a partial elevational view showing the output end of a plasticating extruder screw having a double channel metering wave section in accordance with another aspect of the invention.

FIG. 7 is a pair of diagrams a and b illustrating the depth variations over one cycle for adjacent channels in the screw shown in FIG. 6.

FIG. 8 is a partial elevational view of a two stage screw embodying a wave section in the second pumping or metering stage.

FIG. 9 is an elevational view illustrating the combination of a metering wave section with a barrier type mixing section and a short, constant channel depth, metering section at the end of an extruder screw.

DETAILED DESCRIPTION OF THE PREFERRED EMBODIMENTS

Although the present invention is concerned particularly with the configuration of extruder screws, it will be helpful initially to consider generally the overall organization of a typical plasticating extruder machine. The machine shown in FIG. 1 includes frame means 2 having upwardly extending portions 4 and 6 at its ends for supporting the actual extrusion components. These components include a horizontally extending barrel 8 and a screw 10 rotatably disposed within the barrel 8. At its rear end the barrel 8 communicates with a feed opening 12 extending upwardly through a stationary thrust housing 14. This feed opening 12 ordinarily receives material from a hopper (not shown) overlying the thrust housing 14.

The rear end of the screw 10 is mounted for rotation about an axis coincident with the axis of the cylindrical inner surface of the barrel 8 and is coupled to a speed reducer 16 carried by the left end upright 4 of the frame means. The speed reducer 16 is connected by gear means (not shown) and by a flexible coupling 18 to a motor 20.

Temperature control means 22 are associated with the barrel 8 of the extruder to supply heat to and/or remove heat from the material being processed. Such means are conventional, and as indicated in FIG. 1, they may advantageously be located near the feed end of the barrel to so regulate the barrel temperature as to achieve efficient melting of the polymer being fed through the barrel. Pumps 24 and 26 also may be provided to force fluid through jackets 28 and 30 surrounding downstream portions of the barrel. The flowing fluid in these zons ordinarily is employed to remove heat from the barrel so as to prevent excessive temperatures.

The barrel is provided with a transverse opening 32 intermediate to its length. This opening 32 may be plugged in a conventional manner when the extruder is operated with a single stage screw, or it may be coupled by means 34 to a vacuum pump 36 to serve as a vent when the extruder is operated with a two stage screw mounted within the barrel 8 as illustrated in FIG. 1.

A head clamp plate 38 is secured to the outer end of the extruder barrel 8 and provides support for a swing gate 40 of conventional construction. The swing gate 40 has an internal channel for the extrudate, and in the more usual extrusion operations, dies are fixed to the swing gate to receive the extrudate passing through the opening therein.

A breaker plate 42 is shown in FIG. 1 as being fixed in position at the end of the barrel 8. Such a breaker plate 42 is basically a screen through which the polymer melt must pass in moving to the die. It normally prevents particles of impurities or solid polymer from entering the die.

The portions of the extruder which have been described above with reference to FIG. 1 of the drawings are well known to persons skilled in the art, and it will be recognized that numerous variations are possible. However, such variations are not particularly significant as far as the present invention is concerned, and they need not be referred to in detail here.

The screw 10 shown in FIG. 1 as being positioned within the extruder barrel 8 is a relatively complex two stage screw especially suitable for the extrusion of styrene sheet. However, it will be understood that other screws can be used in the machine when desired, and it will be helpful to proceed with a discussion of a simpler form of screw embodying the invention before returning to the FIG. 1 embodiment.

FIGS. 2 and 3 relate to a single stage metering screw 44 which may be used in the machine of FIG. 1 when the vent opening 32 is plugged. It is a single channel screw having a helical land 46 adapted to move in close proximity to the barrel surface so that little if any material passes over the land. Instead, the material advances along the helical channel between adjacent flights of the land.

The screw root 48 is not disposed at the same distance below the top surface of the land 46 throughout the length of the screw 44. Instead, the screw root is provided with different radii in different sections of the screw.

The left end section 50 of the screw 44 shown in FIG. 2 of the drawings is a so-called feed section intended to receive solid polymer for plastication and extrusion in the apparatus. In this section the radius of the screw root is small and the depth of the material channel between the screw root and the inner cylindrical surface of the barrel of the extruder is large. The deep channel depth gives the feed section of the screw a high material delivery rate and causes the particles or pellets of solid polymer to be compacted and compressed. The turning of the screw works the solid bed of plastic to generate heat which serves to melt the solid material. As was mentioned above, heat may be added to or taken away from the extruder barrel by means 22 to exert an additional element of control over the progress of the melting action. The feed section 50 is shown at FIG. 2 as having a length of about five flights of the screw. In this section the depth of the material channel is substantially constant.

Downstream from the feed section 50 is a so-called transition section 52 shown in FIG. 2 as having a length of about nine flights of the screw. In this zone the radius of the screw root is gradually increased so that the helical polymer channel becomes progressively narrower. The melting of the material continues as it moves into the transition section 52. This melting takes place for the most part at an interface between a film of molten polymer and a solid bed of packed particle polymers. As the melting continues, however, a point is reached where the solid bed breaks up and small particles of solid polymer become dispersed in the body of a molten polymer. This solid bed breakup occurs usually after about 40 to 70percent of the polymer had been melted. Further melting takes place as the material advances along the narrowing transition section 52, with the shearing and mixing actions accomplished in the shallow downstream end portion of the transition section contributing significantly to the efficient melting of such polymer particles as may remain in solid form after breakup of the bed of packed particle polymers.

The final working and pumping of the polymer is achieved in a long metering section 54 of the screw 44 shown in FIG. 2. This is the section of the screw which is relied upon to deliver high quality polymer melt to the die at a uniform rate. In a conventional screw, the radius of the screw root in the metering section would be large and would be constant throughout the length of the metering section to provide a shallow material channel of uniform cross-section and great length. Such metering sections of conventional configurations are satisfactory for many applications, but in applications where high outputs must be achieved, there is a tendency for them to raise the temperature of the polymer to unacceptable levels and/or permit material to reach the extruder outlet without having been mixed sufficiently to eliminate physical nonuniformities in the melt.

The metering section 54 of the screw 44 includes a short initial portion 56 of constant channel depth, a long intermediate portion 58 of cyclically varying channel depth, and a short final portion 60 of constant channel depth. As shown in FIG. 2, the initial and final channel sections 56 and 60 are each about two screw flights long. The depths of the material channels in these portions 56 and 60 of the metering section may be comparable to those employed in conventional metering sections of comparable diameters. Because of their short lengths, the portions 56 and 60 do not have any substantial tendency to overheat the polymer.

The intermediate portion 58 of the metering section 54 of the screw 44 has a varying channel depth. The radius of the screw root in this portion 58 of the screw increases and decreases as a wave function. The wave form may be symmetrical, such as a repeating sine wave, or it may if desired have a repeating asymmetrical configuration. As illustrated, each wave or cycle is completed over a length of the material channel corresponding to one and one-half turns (540°) about the axis of the screw 44. At locations where the radius is greatest, the channel depth is materially less than the channel depth of the initial and final portions 56 and 60 of the metering section. At locations where the radius is smallest however, the channel depth is greater than the depth of the channel in the portions 56 and 60. Even in these portions of maximum channel depth however, the channel usually will be shallower than the channel in the feed section 50 of the screw, particularly in the case of screws for handling materials supplied as low bulk density powders or pellets. In the FIG. 2 embodiment the wave portion 58 extends over twelve flights of the screw and contains eight cycles of the wave.

The diagrams a and b of FIG. 3 show two successive cycles of screw root radius variation. In the first cycle (diagram a) the channel depth increases as one moves along the channel for the first 270° about the axis of the screw, and then the channel depth decreases over a comparable length. This disposes successive peaks on opposite sides of the screw. As the wave progresses through the second cycle (diagram b), the channel depth again increases over 270° and then decreases during the next 270°. This pattern disposes adjacent peaks and adjacent valleys in the material channel on opposite sides of the screw to balance lateral thrusts and prevent the development of damaging misalignment problems in the extruder.

The wave portion 58 of the screw performs both metering and mixing functions. Insofar as metering or pumping is concerned, the repeating waves exhibit all the advantages of a constant depth metering section. The systematically repeating wave pattern functions like conventional long metering sections of constant depth in the sense of providing uniform output approximately proportioned to screw rotational speed and providing normal resistance to pressure flow in a rearward direction along the screw channel. Each wave reinforces the flow characteristics generated by other waves in somewhat the same manner as each turn of a constant depth metering section reinforces the flow characteristic generated by adjacent turns.

In addition to its good metering properties, the wave portion 58 of the screw of this invention has the advantage of achieving good mixing of the polymer without generating excessive heat. In zones where the screw root peaks to narrow the material channel, the material is subject to high shear forces so that incompletely melted polymer will be worked and mixed vigorously with the molten material. These zones of high shear are not so long however as to give rise to temperature problems. The material passes from each zone of high shearing action into an adjacent zone of increased channel depth where the heat generating effects are much less intense.

Some exemplary dimensions will serve to further illustrate the nature of a single stage screw embodying the invention and being similar to that illustrated in FIG. 2 of the drawings except for the 0.850 pitch of the helical land 46. FIG. 2 does not show the usual "square" pitch because it was deemed desirable to illustrate a number of turns in a short space. It will be understood however that a square pitch screw is one in which the longitudinal distance between adjacent flights of the land is equal to the diameter of the cylindrical inner surface of the extruder barrel within which the screw is mounted.

Desirable results have been obtained with a square pitch screw having a diameter of four and one half inches and a length-to-diameter ratio of 30:1. This screw was like the screw of FIG. 2 in the sense that it included a feed section about five turns long, a transition section about nine turns long, and a metering section about fourteen turns long. The metering section included an initial constant depth portion about two turns in length and a similar final portion. The metering section also included an intermediately located wave portion about twelve flights long to provide eight waves, each having an angular extent of 540°.

The channel depth in the feed section of the screw was one inch. The channel depth in the initial and final, constant channel depth, portions of the metering section was 0.250 inch, and the channel depth in the transition section decreased smoothly and regularly from a value corresponding to the channel depth in the feed section to a value corresponding to the channel depth in the initial constant channel depth portion of the metering section of the screw. In the wave portion of the metering section of the screw, the channel depth varied as a sine wave, with the minimum channel depth being 0.140 inch and the maximum channel depth being 0.600 inch.

Returning to FIG. 1, the screw 10 illustrated there is a two stage screw having a wave portion 62 in the first metering section. Otherwise the screw 10 is conventional. In an embodiment having a diameter of four and one half inches and a length-to-diameter ratio of 30:1, the square pitch screw included a feed section about five flights along having a channel depth of 0.850 inch, a first transition section about five flights long tapering smoothly to a channel depth of 0.180 inch, a first metering section having a one turn long constant depth entry of 0.180 inch and a sine wave portion about nine flights long. This sine wave portion had a channel depth varying between 0.120 inch and 0.500 inch, with each wave occupying about one and one-half turns (540°) about the axis of the screw. Following the first metering section, there was a short, one flight long, transition zone to a severely relieved vent section having a channel depth of 0.950 inch and a length of about two flights. A slightly longer transition zone of about 1.5 flights led from the vent section to a final metering section having a length of 5.5 flights and a constant channel depth of 0.350 inch.

The location of the wave portion 62 in the first metering section of the two stage screw shown in FIG. 1 is particularly desirable from the standpoint of assuring complete melting of the material so as to obtain high quality melt at the output of the screw. Any solid particle material reaching the wave section 62 will undergo intensive mixing and working in this section, and the cyclical repetition of the imposition of high shear forces serves to assure that all of the polymer will have the proper state and consistency as it is introduced into the vent or decompression section. In the vent section of course, volatiles are released as the material is decompressed, and these volatiles may be drawn off by the vacuum pump 36.

Although 540° waves have been shown in the embodiments of FIGS. 1 and 2, it is not essential that the waves have such lengths. FIGS. 4 and 5 illustrate an embodiment in which each wave is only about 180°. That is to say, in a single channel screw 64, the material moving along the screw channel will pass through a complete cycle of channel depth variations as the material moves 180° about the axis of the screw. In the illustrations of this embodiment, the land of the screw is designated 66 and the root of the screw is designated 68.

The diagrams of FIG. 5 illustrate how the mechanical balance of the screw is mantained in the FIG. 4 embodiment. One wave or cycle is shown in diagram a. A successive wave or cycle is shown in diagram b. As these diagrams make clear, the use of a cycle 180° long assures that adjacent peaks of the wave will be disposed on opposite sides of the screw and that adjacent valleys also will be located on opposite sides of the screw. This balanced relationship protects against mechanical misalignment which might result in excessive wear or binding of the screw under some conditions.

Yet another type of variation in the application of the wave screw principle is indicated in FIGS. 6 and 7 of the drawings. In this embodiment a double channel wave screw metering section 70 is located at the output end of an extruder screw. FIG. 6 does not illustrate all of the upstream portions of the screw because these may be conventional. At the left of the screw in FIG. 6, a small fragment of a transition section defined by adjacent flights of a helical land 72 is shown as leading into the metering section 70. At the beginning of the metering section 70, another helical land 74 rises in the middle of the flow channel and proceeds in parallel with the land 72, so that the flow is divided into two adjacent channels 76 and 78. The flows from the two channels combine again at the end of the screw.

The waves shown in FIGS. 6 and 7 are comparatively long. In this instance, each wave is completed over a distance corresponding to three turns (1080°) about the axis of the screw. It is anticipated that in most practical applications of the wave screw principle, the wave or cycle length will fall somewhere between the 180° value indicated in FIGS. 4 and 5 and the 1080° value indicated in FIGS. 6 and 7.

When a 1080° cycle length is used, it is not possible to achieve the desired mechanical balance of the screw with only a single screw channel. This is so because adjacent peaks of the wave in a given channel occur at the same angular position about the axis of the screw, and the valleys all occur on the opposite side of the screw. With this arrangement, there would be a tendency in a single channel construction for the screw to bend and flex laterally in response to the forces exerted as the inclined surfaces press against the material being processed.

However, where multiple screw channels are employed, the desired mechanical balance can be achieved on a running basis by disposing the waves in adjacent channels out of phase with each other. Such an approach is illustrated in FIGS. 6 and 7 where the waves of a two channel wave section are 180° out of phase with each other. Diagram a in FIG. 7 shows the first cycle of channel 78, and diagram b shows the first cycle of channel 76. The cycles in the two channels are staggered, so that the peaks in channel 78 are disposed on one side of the axis of the screw and the peaks in channel 76 are disposed on the opposite side of the axis of the screw.

It also is to be noted that the metering waves in the FIG. 6 embodiment are not preceded or followed by metering portions of constant depth. Although short, constant channel depth, portions 56 and 60 have been incorporated in the metering sections of some wave screws embodying the present invention, either or both or such constant channel depth portions may be omitted when desired.

FIG. 8 illustrates another two stage screw embodying the present invention. This screw 80 includes a feed section 82, a transition section 84, a first metering or pumping section 86 of constant channel depth, a transition section 88, a vent or decompression section 90, a transition section 92, a metering wave section 94 and a short metering section 96 of constant channel depth. In this embodiment the wave portion 94 serves as the second metering section of the two stage screw and serves to assure the delivery of high quality polymer melt at the outlet of the extruder. Configurations such as this are particularly appropriate for the handling of difficult to melt material.

A screw similar to that illustrated in FIG. 8 has been designed for a rigid vinyl pipe application. Some exemplary dimensions of this screw will serve to further illustrate the invention. The screw has a diameter of 2½ inches and a length-to-diameter ratio of 30:1. It is of square pitch and includes a feed section about five flights long having a constant channel depth of 0.450 inch. A four flight long, smoothly tapered, transition section leads to a first metering or pumping section of constant channel depth. This first metering section is about four flights long and has a channel depth of 0.135 inch. A short transition section then leads to a relieved vent section having a channel depth of about 0.550 inch. A slightly longer, two turn transition section leads out of the venting zone and to a metering wave section nine flights long. Each wave is about 540° in length and has a channel depth varying as a sine wave between 0.120 inch and 0.480 inch. A final stabilizing metering section two flights long has a channel depth of 0.240 inch.

It also is anticipated that the wave screw principle of the present invention will be used on occasion in combination with intensive mixing sections of the barrier type. Such an arrangement is suggested in FIG. 9 where a wave screw section 98 similar to the wave screw section 54 in FIG. 2 is employed to deliver material to a barrier mixer 100. From the output of the mixer 100, the material passes to a short final metering section 102 of constant channel depth.

The mixer 100 may have a length equal to the length of about two flights of the main screw. At its entrance end (the left end in FIG. 9), spaced apart channels 104 formed by land structures 106 lead axially forward into the mixing unit. Similar channels 103 open to the discharge end of the mixer unit 100. Neither the channels 104 nor the channels 108 extend the full length of the mixer device however, and the material may move through the mixer section only by passing over barrier lands 110 disposed between respective ones of the inlet channels 104 and the adjacent outlet channels 108. These barrier lands 110 are recessed slightly from the level of the lands 106 to allow passage of the material from the inlet passages 104 to the outlet passages 108. Such mixer sections can be quite effective in assuring that no unmelted polymer will reach the outlet of the extruder. On the other hand, they impose severe restrictions upon the flow. These mixer sections will not ordinarily be needed when the wave screw of the present invention is employed, but they may be used to supplement the wave screw in any instance where this may be considered desirable.

Still other modifications and variations of the invention will be evident to persons of ordinary skill in the art. It is intended, therefore, that the foregoing detailed descriptions of certain embodiments illustrated in the accompanying drawings be considered as exemplary only and that the scope of the invention be ascertained from the following claims.

What is claimed is:

1. A process for extruding polymeric material in a molten state under pressure comprising:

feeding polymeric material in the form of a particulate solid to a barrel having a cylindrical inner surface and having rotating therein screw means provided with conveying land means disposed in close proximity to said cylindrical inner surface to continuously move said material in a substantially helical path toward an extrusion die without shearing said material over shearing land means disposed intermediate axially adjacent portions of said conveying land means, converting said material to a generally molten state with no more than a minor amount of incompletely melted particles therein, and metering the flow of the generally molten material by cyclically varying, through at least three cycles, the cross sectional area between axially adjacent portions of said conveying land means of the helical path by varying the depth of the helical path from the inner wall of the barrel between a minimum depth at which the material is subjected to maximum shearing force and heat production and a maximum depth at which the material is subjected to lower shearing force and heat production, whereby the high energy input into said polymeric material during the portions of the cycles when the depth of the path from the inner wall is in the order of said minimum depth assures complete melting of all of said incompletely melted particles, without the molten material being raised to such a temperature over said plurality of cycles as to cause it to be degraded thereby.

2. A process as recited in claim 1, wherein the circumferential position on the screw means at which the minimum depth of the path during one cycle of variation occurs is displaced substantially 180° about the axis of the screw means from the circumferential position at which the minimum depth of the path of an adjacent cycle of variation occurs.

3. A process for extruding polymeric material in a molten state under pressure comprising:

feeding polymeric material in a solid state to a conveyor in which a helical screw rotated in a barrel with a cylindrical inner surface continuously moves said material in a substantially helical path toward an extrusion die, applying heat to said material by working the material between the wall and screw to convert it to a molten state with no more than a minor amount of unmelted particles therein, dividing said molten material into two adjacent substantially parallel paths of helical flow through a metering zone, and metering the flow of molten material in each of said parallel paths by cyclically varying, through a plurality of cycles, the depth of each said path from the inner wall of the barrel between a minimum depth at which the material is subjected to maximum shearing force and heat production and a maximum depth at which the material is subject to lower shearing force and heat production, said depth variations in the two parallel paths being arranged so that the combined cross sectional areas of axially adjacent portions of the two paths vary longitudinally along the helical direction, whereby the high energy input into said polymeric material during the portions of the cycles when the depth of the path from the inner wall is in the order of said minimum depth assures complete melting of all of said incompletely melted particles, without the molten material being raised to such a temperature over said plurality of cycles as to cause it to be degraded thereby.

* * * * *